United States Patent [19]

Doerfling

[11] 4,379,103

[45] Apr. 5, 1983

[54] METHOD OF FORMING A FOAM RESIN CORE STRUCTURE HAVING A SMOOTH COMPOSITE REINFORCED INTEGRAL SKIN

[75] Inventor: Ralph G. Doerfling, Northville, Mich.

[73] Assignee: Detroit Gasket & Manufacturing Co., Detroit, Mich.

[21] Appl. No.: 180,740

[22] Filed: Aug. 25, 1980

[51] Int. Cl.³ .............................................. B29D 27/00
[52] U.S. Cl. .................................. 264/45.5; 264/46.5; 264/261; 425/812; 425/817 R
[58] Field of Search ..................... 264/45.3, 46.5, 45.5, 264/261; 425/129 R, 812, 817 R

[56] References Cited

U.S. PATENT DOCUMENTS

| | | | |
|---|---|---|---|
| 2,642,920 | 6/1953 | Simon et al. | 264/46.5 X |
| 2,855,021 | 10/1958 | Hoppe | 264/45.3 X |
| 3,193,598 | 7/1965 | Schafer | 264/45.3 X |
| 3,546,060 | 12/1970 | Hoppe et al. | 264/45.3 X |
| 3,627,603 | 12/1971 | Greig | 264/45.3 X |
| 3,733,380 | 5/1973 | Ishida | 264/46.5 |
| 3,792,141 | 2/1974 | Offutt | 264/46.5 X |
| 3,867,494 | 2/1975 | Rood et al. | 264/45.3 |
| 3,900,650 | 8/1975 | Sedore | 264/45.3 X |
| 4,119,583 | 10/1978 | Filip et al. | 264/46.5 X |
| 4,130,614 | 12/1978 | Saidla | 264/45.3 X |

FOREIGN PATENT DOCUMENTS 253610  2/1970  U.S.S.R. ............................ 264/46.5

Primary Examiner—Philip E. Anderson
Attorney, Agent, or Firm—Cullen, Sloman, Cantor, Grauer, Scott & Rutherford

[57] ABSTRACT

A strong foam core structural member having an integral skin and a method of forming the foam core structure using conventional tooling, such as a clamshell mold. The method includes injecting a fluid foamable resin reaction mixture under pressure in a mold between a pair of pervious, absorbant, flexible sheets, preferably each including a nonresilient open mesh skrim. The sheets are thus expanded against the mold faces by the foaming reaction mixture, which saturates the sheets and forms a smooth skin integral with the foam core. The pervious sheets permit entrapped gasses to escape, forming a smooth integral skin on the foam core, which substantially improves the strength of the structure. The structure may also be strengthened by adding perforated reinforcement plates and injecting the fluid resin reaction mixture through and around the plates. The reinforcement plates thus become integral with the foam core.

8 Claims, 6 Drawing Figures

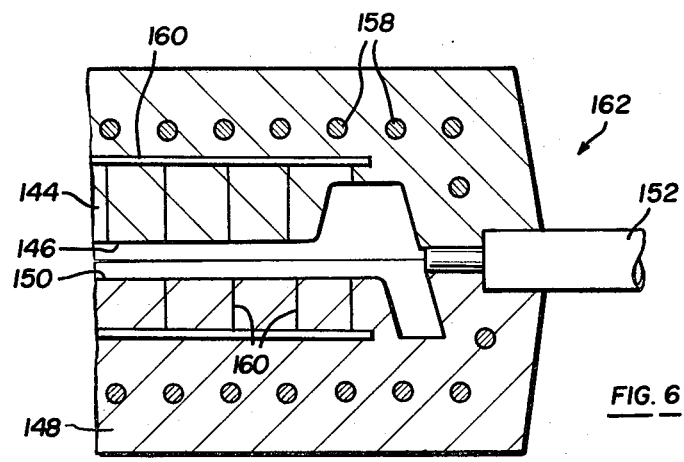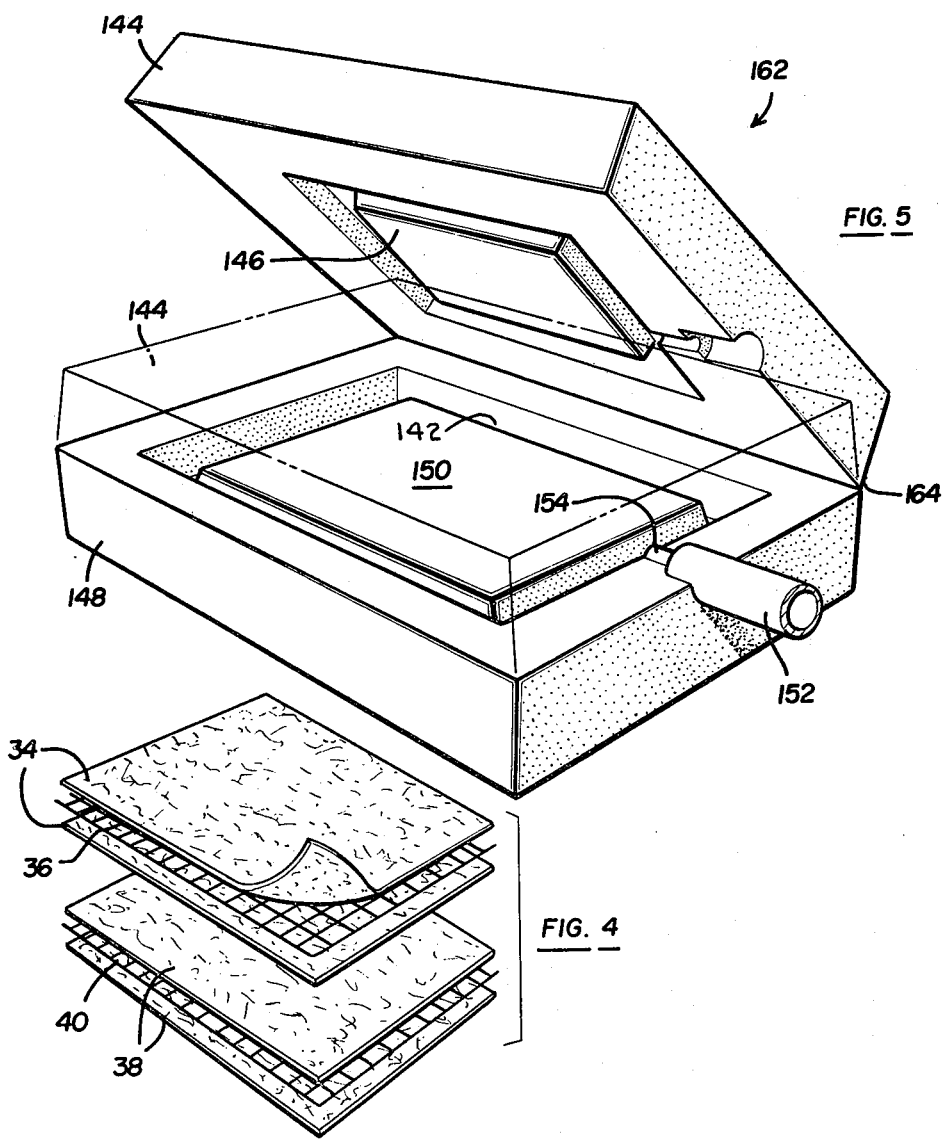

METHOD OF FORMING A FOAM RESIN CORE STRUCTURE HAVING A SMOOTH COMPOSITE REINFORCED INTEGRAL SKIN

FIELD OF THE INVENTION

The foam core structure and method of this invention is particularly useful in forming strong, lightweight foam core structures, including interior load bearing structural members used in the automotive industry. Suitable automotive applications include loadfloors, sun visors, interior load bearing and decorative paneling, etc. The foam core structure of this invention may be formed into various contoured shapes and may be finished with cloth, vinyl, carpeting, etc.

DESCRIPTION OF THE PRIOR ART

The requirement for strong, lightweight foam core structures is paticularly acute in the automotive industry where statutorily imposed improved mileage dictates substantial weight reductions. The structures used in automotive interior applications must also be capable of withstanding substantial variations in temperature and preferably provide sound attenuation. Load bearing members, such as the loadfloor in an automotive hatchback, must also withstand shock loading and preferably are contoured for strength and aesthetic reasons. These stringent requirements are particularly difficult to achieve in foam core structures which are inherently weak and subject to shear fracture.

Polymer or resin foam structures are becoming more popular in automotive applications because of the weight reduction achieved by using polymer foam, particularly panels including polyurethane foam. Rigid or self-supporting structures generally use closed cell or rigid polymer foams, including polymerized polyurethane foam, such as disclosed in my U.S. Pat. No. 4,078,100. Self-supporting contoured foam structures may also be formed by laminating a resilient or semirigid foam to a self-supporting panel, as disclosed in my U.S. Pat. Nos. 4,077,821 and 4,150,850. These structures are not however suitable for load bearing applications and require lamination of the separately formed layers.

As described below, the preferred embodiment of the foam core structure of this invention includes an open mesh nonresilient skrim where the structure is subject to shear or torsion loading, such as a load bearing member. Skrim sheets of this type have already been formed in polyurethane foam panels, as disclosed in my above referenced U.S. Pat. No. 4,078,100. A nonresilient open mesh skrim may however actually reduce the shear strength of a rigid resin foam structure where the skrim is located in the core in direct contact with the foam. Special tooling may also be required to form laminated structures of this type. Self-skinning rigid foam structures, including rigid polyurethane foam structures, have been formed in clamshell molds and the like. The need however remains for a strong, lightweight foam core structure having an integral smooth skin suitable for automotive applications, as described hereinabove.

SUMMARY OF THE INVENTION

The method of this invention is relatively simple, utilizing conventional tooling, and results in a unique foam core structure which is strong, lightweight and suitable for automotive applications. The preferred method of this invention includes locating two pervious, absorbant, low density, flexible sheets in a die or mold having opposed die surfaces facing the sheets. Where the preferred foam core structure is contoured, the die surfaces are contoured and preferably heated. A fluid foamable thermosetting resin reaction mixture is then injected under pressure between the sheets, such that the foaming reaction mixture expands the sheets against the opposed die surfaces. The sheets absorb the fluid thermosetting resin, while permitting the entrapped gas to escape through the sheets. Finally, the thermosetting resin is cured in the die or mold, forming a smooth integral skin on opposed sides of a thermosetting resin foam core. In the preferred embodiment, an open mesh, relatively nonresilient flexible skrim is retained to the absorbant sheets, with the absorbant sheets located adjacent the die surfaces. In the most preferred embodiment, the skrim is located between a pair of absorbant sheets, such that the assembly includes two pairs of absorbant sheets; each pair including a skrim located between the pair of sheets. Perforated reinforcement plates may be added between the absorbant sheets and the foam core is blown through and around the plates.

The preferred reaction foam mixture is a liquid foamable closed cell polyurethane having a density great enough to expand the sheets against the opposed die surfaces, but low enough to wet and saturate the sheets. A thin film of polyurethane may thus be formed on the exterior surface of the sheets, providing a smooth exterior surface on the foam core structure. In the preferred embodiment, the absorbant sheets are pervious, absorbant, low density paper sheets as are presently used in disposable diapers and the like.

The resultant foam core structure thus includes a rigid thermosetting resin foam core and an integral outer skin. The skin includes the absorbant, relatively low density outer sheet and preferably an open mesh, relatively nonresilient skrim sheet. As described, the most preferred embodiment includes two pairs of absorbant sheets, each having a skrim sheet located therebetween. The skrim sheets substantially improve the strength of the foam core structure, such that the structure may be used as a load bearing member. Locating the skrim sheets between the absorbant sheets prevents cutting of the foam core by the nonresilient skrim, when the foam core structure is placed in shear, thus substantially improving the shear strength of the structure. Further, locating the skrim at the exterior surfaces of the foam core structure, substantially improves the overall load bearing strength of the structure in tension and compression. Where metal reinforcing plates are used, the plates are preferably located in the foam core. As described above, the foam is blown through the perforated plates and the foam core is integral through the plates. The reinforcing plates thus become an integral part of the foam core structure. The exterior surface of the foam core structure is relatively smooth because entrapped gasses are permitted to escape through the outer sheets as the foam expands the sheets against the die surfaces, avoiding air bubbles and other imperfections in the skin. The foam core structure may thus be finished simply by applying a finish surface, such as vinyl, cloth, carpeting, etc. or one of the sheets may be a finish sheet.

Other advantages and meritorious features of the foam core structure and method of this invention will be more fully understood from the following description of the preferred embodiments, the appended claims and the drawings, a brief description of which follows.

BRIEF DESCRIPTION OF THE DRAWINGS

FIG. 4 is an exploded view of the components which may be utilized in the foam core structure and method of this invention;

FIG. 5 is a side perspective elevation of a mold which may be utilized to form the foam core structure shown in FIG. 1; and FIG. 6 is a partial side cross-sectional view of the mold apparatus shown in FIG. 5.

DESCRIPTION OF THE PREFERRED EMBODIMENTS AND METHOD OF THIS INVENTION

Figure 1:
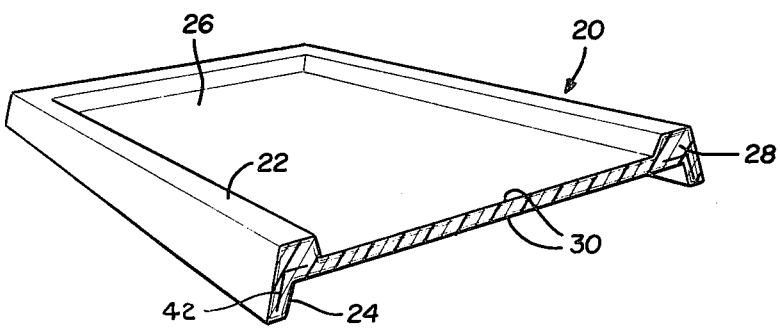
FIG. 1 is a side perspective cross-sectional view of one embodiment of the foam core structure of this invention.

FIG. 1 illustrates a typical foam core structure 20 which may be formed by the method of this invention. The disclosed embodiment is an automotive loadfloor, such as used in automotive hatchbacks to cover the trunk well. The disclosed embodiment includes an upwardly extending trapezoidal rib 22, which terminates in a downwardly extending rib or foot 24, which in combination define a thinner central web portion 26. FIG. 1 is a cross-sectional view and illustrates one-half of the loadfloor. As described above, an automotive loadfloor is weight bearing and therefore subject to compressive and tensil stress and shear fracture. The loadfloor 20 disclosed in FIG. 1 includes a foam core or intermediate portion 28 and an integral skin 30.

Figure 2:
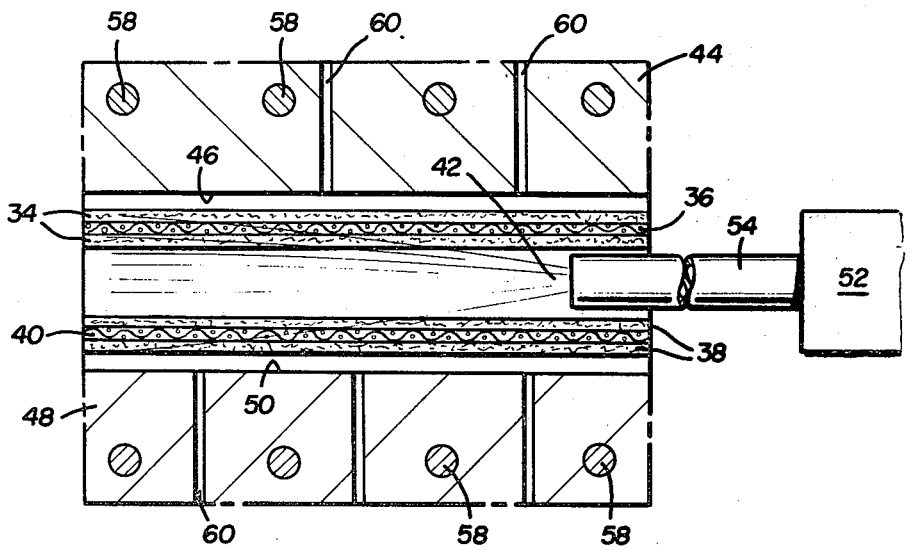
FIG. 2 is a partially schematic side cross-sectional view of a mold apparatus illustrating the method of this invention.
Figure 3:
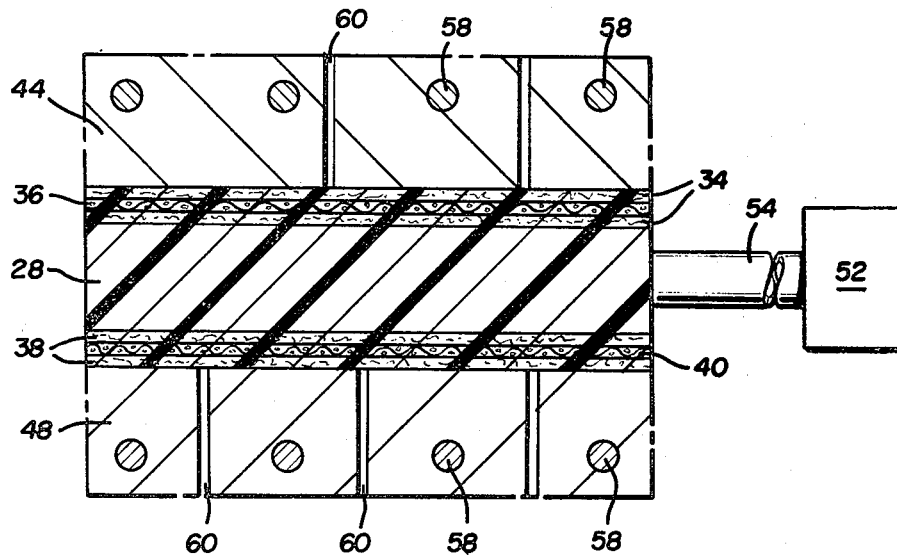
FIG. 3 is a partially schematic side cross-sectional view of the apparatus shown in FIG. 2, after the foam core structure has been formed.

FIGS. 2 and 3 illustrate, somewhat schematically, the method of forming the loadfloor 20 of FIG. 1. As described above, the method of this invention includes locating two pervious absorbant sheets in a mold or die, injecting a fluid foamable thermosetting resin reaction mixture under pressure between the sheets and then curing the thermosetting resin. In the most preferred embodiment, each sheet comprises a pair of absorbant sheets with an open mesh skrim sheet between each pair of sheets. As shown in FIG. 4, the upper sheet is composed of two pervious absorbant sheets 34 and an open mesh skrim sheet 36 therebetween. The lower sheet is composed of a pair of pervious, absorbant sheets 38 with a skrim sheet 40 therebetween.

The absorbant sheets 34 and 38 are preferably flexible to conform to the configured die faces during molding. The absorbant sheet must have a relatively low density, such that the sheets will "float" on the foaming thermosetting reaction mixture to the surface, where the sheets become part of the "skin". The sheets must also be absorbant, such that the resin will "wet" the sheets and form an integral skin. Finally, at least one and preferably both of the sheets are pervious, such that gas is permitted to escape through the sheets in the molding operation, as described hereinbelow. The most preferred material is a low density nonwoven absorbant paper, such as utilized in disposable paper baby diapers. A suitable paper is marketed by the Scott Paper Company under the trade name "Hi-Loft" and used for disposable baby diapers. Absorbant paper toweling may also be utilized, but several brands are not as strong as the paper utilized for baby diapers. Relatively thin sheets of soft open cell polyurethane foam have also been tried successfully, however the thermosetting reaction mixture does not fully wet or saturate the foam sheet and therefore foam sheets are preferably used for the outer sheet or layer.

It is understood that the skin forming sheets may also be of different materials or an integral skin may be formed on only one side of the form core structure. For example, kraft fiberboard may be used for one sheet and the opposite sheet may be formed of a pair of absorbant paper sheets and a skrim sheet, as described below. The kraft fiberboard sheet is sufficiently absorbant to be "wet" by the foaming resin reaction mixture and form an integral skin on one side of the structure; the paper sheets are saturated and form an integral skin on the opposite side. Fiberboard is considerably more expensive than the preferred paper sheets, however fiberboard substantially increases the load bearing capacity of the structure. Other absorbant pervious fiber materials may also be utilized, however the most preferred embodiment utilizes paper sheets because of the substantial savings in cost and the excellent results obtained.

The skrim sheet is an open mesh or loosely woven sheet of nonresilient strands, preferably polyester, such as nylon or similar material. Where only one absorbant sheet is used, the absorbant sheets should be located at the outside to form the outer skin of the foam core structure, and the skrim should be tacked or otherwise retained on the inside absorbant sheets. The skrim is retained to the absorbant sheet to prevent the skrim from separately floating in the thermosetting reaction mixture and assure that the skrim is located at the outside skin of the foam core structure to provide the necessary strength for the structure. The most preferred embodiment includes two pairs of absorbant sheets, such that the nonresilient skrim does not cut the foam core when the structure is placed in tension or compression, which would substantially reduce the shear strength of the structure. The sheets may be loosely disposed in the mold or die member as shown in FIG. 2 or the sheets 34 and 38 may be tacked at their outer edges or folded to form an envelope composed of the opposed pairs of sheets 34 and 38. The reaction mixture is then injected into the envelope. An envelope may be preferred in certain applications, such as sun visors or similar structures.

The foam core structure of this invention may also be reinforced by adding reinforcement plates. For example, the foam core structure 20 of FIG. 1 includes opposed L-shaped reinforcing plates 42 in the foam core, on opposite sides in the longer downwardly extending ribs 24. The reinforcing plates are perforated (not shown), such that the rigid thermosetting foam extends through the plates and the plates become an integral part of the structure. The reinforcing plates 42 are preferably formed of metal, such as steel or aluminum. In the disclosed embodiment, steel plates were used having a thickness of 1/32 inches and one half inch holes on six inch centers. The plates are set in the mold, between the opposed pair of absorbant sheets 34 and 38. The fluid foamable resin reaction mixture is then injected or blown between the absorbant sheets, as described above. Where the plates do not interfere with the flow of the fluid resin reaction mixture, perforations may not be necessary. The metal plates do not float in the foaming reaction mixture, but the fluid and foam flows through the perforations in the plate. The metal plate 42 thus becomes an integral part of the foam core structure and substantially strengthens the weight bearing capacity of the structure.

The mold apparatus disclosed in FIGS. 2 and 3 includes an upper mold member or die platten 44 having an upper contoured mold face 46 and a lower mold member or die platten 48 having a contoured lower mold face 50. In the disclosed embodiment, the foamable thermosetting reaction mixture is injected between the sheets by a gun 52 having a retractable nozzle 54. The foaming reaction mixture used in the method of this invention must have a density sufficient to expand the sheets 34 and 38 against the opposed mold surfaces 46 and 50, respectively, but wet enough to wet and preferably saturate the sheets as described. Rigid closed cell polyurethane foams have been found particularly suitable for the foam core structure of this invention, including load bearing structural members, such as the load floor illustrated in FIG. 1. A suitable polyurethane foam includes a polymeric isocyanate with a functionality of 2.7 as the A component. The B component preferably includes a fluorocarbon blowing agent and a blend of high functionality sucrose based polyols, providing a high degree of cross-linking and rigidity. One suitable polyurethane foam had a free blown density of about two lbs./ft.$^3$. The foam had a blown density of about five lbs./ft.$^3$ in the loadfloor disclosed in FIG. 1.

As the absorbant sheets 34 and 38 are expanded against the opposed mold surfaces 46 and 50, respectively, by the foaming reaction mixture, the air and entrapped gasses flow through the permeable sheets, avoiding shear bubbles in the skin of the foam core structure. The gasses then escape through vents 60 in the upper and lower mold members. The absorbant sheets thus "float" on the foaming and expanding thermosetting reaction mixture and simultaneously absorb resin to form the integral skin 30 of the foam core structure, as shown in FIG. 3. The preferred viscosity of the foamable thermosetting resin reaction mixture is between about 200 and 300 centipoise. A viscosity of about 150 centipoise may be made suitable by adjusting the temperature and the creaming rate of the foam. A closed cell rigid polyurethane reaction mixture having a viscosity of about 230 centipoise have been found particularly suitable in forming the loadfloor of FIG. 1, using the permeable absorbant paper sheets described hereinabove. The nozzle 54 is then retracted and the thermosetting resin is cured in the mold, as shown in FIG. 3, forming an integral skin 30 on the foam core 28. In a typical application, a foamable polyurethane reaction mixture was injected into the mold at about 1000 psi; the foam had a blowing pressure of about 15 psi. The preferred mold is heated to aid in curing the thermosetting resin. In the disclosed embodiment, the mold members include fluid heating channels 58. In a typical application, the mold is heated to about 100° F. and maintained at that temperature during blowing. The thermosetting mixture is also preferably preheated. In the example described above, the reaction mixture was preheated to 85° F.

As described, the fluid thermosetting resin reaction mixture wets the absorbant sheets, 34 and 38, forming an integral skin on the foam core. In the most preferred embodiment, the fluid reaction mixture completely saturates the outer sheets, forming a thin film of a relatively high density thermosetting resin on the exterior surface of the foam core structure. This film and the absence of shear bubbles forms a very smooth exterior surface on the foam core structure which may be finished by applying a sheet of cloth, vinyl, carpeting, or the like, without further finishing operations. Further, the resin film seals the structure, avoiding later absorption of moisture.

FIGS. 5 and 6 illustrate a suitable mold apparatus which may be utilized in the method of this invention in forming the foam core structure of FIG. 1. The mold assembly 162 is a conventional clamshell-type mold having an upper mold member or platten 144 and a lower mold member or platten 148 which is attached by hinge means along the adjacent edges 164 and by clamp means, not shown, along the opposed edges. As described above, two permeable, absorbant sheets are placed in the mold on the opposed mold faces 146 and 150 and a fluid foamable thermosetting resin reaction mixture is injected under pressure between the sheets through retractable nozzle 154. As described above, the mold is preferably heated through ports 158 and the entrapped gas is vented through vents 160. Where reinforcing plates are used in the foam core structure as shown at 42 in FIG. 1, the plates are placed in the mold in the longitudinal grooves 142, preferably not opposite the nozzle 154. The foamable reaction mixture thus flows along and through the perforated plates and the plates do not interfere with the forming operation. As described above, the plates thus become an integral part of the foam core structure.

The resultant structure includes a rigid thermosetting resin foam core 28, as shown in FIG. 1, and an integral outer skin 30, which comprises the absorbant sheets and preferably an open mesh, relatively nonresilient skrim sheet. The thermosetting resin is absorbed through the skrim and into the absorbant sheet, forming the integral skin. In the most preferred embodiment, the foam core structure includes two pair of absorbant sheets, 34 and 36, each having an open mesh, relatively nonresilient skrim sheet therebetween, 36 and 38, respectively. It will be understood that various modifications may be made to the disclosed apparatus, which does not form a part of this invention.

What is claimed is:
1. The method of forming a foam resin core structure having a smooth composite reinforced integral skin, comprising the following steps:
  (a) inserting two pervious, absorbant, low density, flexible sheets in an enclosed die assembly having opposed spaced apart die surfaces and side surfaces, said die surfaces forming an enclosed die cavity, said sheets positioned within said die cavity in spaced apart relationship to one another and generally parallel to said opposed spaced die surfaces, and said opposed die surfaces having pressure relief openings,
  (b) injecting a fluid foamable thermosetting resin reaction mixture under pressure into said enclosed die cavity and into the space between said sheets, said reaction mixture foaming and expanding or forcing said sheets against said opposed spaced die surfaces, said sheets absorbing said fluid thermosetting resin while permitting gas to escape therethrough into said pressure relief openings, and said resin saturating said sheets and forming a thin resin film on the exterior surfaces of said sheets adjacet said opposed spaced die surfaces, and

(c) curing said foamed thermosetting resin in said enclosed die cavity, forming a thermoset resin foam core between said sheets and a relatively smooth composite reinforced integral skin on opposed sides of said core, said composite reinforced integral skin comprising said absorbant sheets soaked with thermosetting resin and a smooth external film of resin.

2. The method of forming a foam resin core structure as defined in claim 1, securing an open mesh, relatively nonresilient flexible skrim sheet in face to face contact to each of said absorbant sheets, then inserting said sheets in said die cavity with said absorbant sheets positioned closest to said opposed spaced die surfaces for forming the outer skin of said foam resin core structure.

3. The method of forming a foam resin core structure defined in claim 1, characterized in that said reaction mixture is a liquid foamable rigid polyurethane having a density sufficient to expand said sheets against said opposed die surfaces, but wet enough to saturate said sheets, forming a thin film of polyurethane on the exterior surface of said sheets.

4. The method of forming a foam resin core structure defined in claim 3, characterized in that said sheets each comprise a pair of pervious, absorbant, low density paper sheets having a loosely woven, relatively nonresilient flexible skrim sheet located between said absorbant sheets.

5. The method of forming a foam core structure defined in claim 1, including locating a perforated metal place in said die cavity and between said sheets and injecting said fluid foamable resin reaction mixture through the perforations in said plate, such that said foam core is integral through the perforations in said plate.

6. The method of forming a foam resin core structure having a smooth composite reinforced integral skin, comprising the following steps:
(a) inserting two pervious, composite absorbant skin sheets in an enclosed mold cavity having opposed spaced apart contoured mold surfaces facing and generally parallel to said skin sheets, said skin sheets positioned within said mold cavity in spaced apart relationship to one another, said skin sheets each comprising outer and inner pervious, low density, absorbant, flexible paper sheets and a relatively nonresilient, flexible, open mesh skrim sheet located between said paper sheets,
(b) injecting a fluid foamable thermosetting resin reaction mixture under pressure into said mold cavity and into the space between said skin sheets, said reaction mixture foaming and expanding or forcing said skin sheets against said opposed spaced mold surfaces, said skin sheets absorbing said fluid thermosetting resin while permitting gas to escape therethrough, said resin saturating said absorbant paper sheets and forming a thin resin film on the exterior surfaces of said outer paper sheets, adjacent said opposed contoured mold surfaces, and
(c) curing said foamed thermosetting resin in said die cavity, forming a thermosetting resin foam core between said skin sheets and a relatively smooth composite reinforced integral skin on opposed sides of said core, said composite reinforced integral skin comprising said skin sheets soaked with thermosetting resin and a relatively thin exterior film of resin.

7. The method of forming a foam resin core structure as defined in claim 6, wherein said reaction mixture is a liquid foamable rigid polyurethane having a density great enough to expand said skin sheets against said opposed mold surfaces, but low enough to saturate said skin sheets, forming a thin film of polyurethane on the exterior surfaces of the outer absorbant sheets.

8. The method of forming a foam resin core structure defined in claim 6, including placing an elongated metal reinforcing plate in said mold at a position between said absorbant skin sheets such that said fluid foamable resin reaction mixture flows around said reinforcing plate and said plate becomes an integral part of said resin foam core structure.

* * * * *